United States Patent
Shah et al.

(10) Patent No.: US 9,798,559 B2
(45) Date of Patent: Oct. 24, 2017

(54) TRUSTED BINARY TRANSLATION

(71) Applicant: McAfee, Inc., Santa Clara, CA (US)

(72) Inventors: Samir Shah, Santa Clara, CA (US);
Ned M. Smith, Beaverton, OR (US);
Jason Martin, Beaverton, OR (US);
Micah J. Sheller, Hillsboro, OR (US);
Somnath Chakrabarti, Portland, OR (US); Bin Xing, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/583,616

(22) Filed: Dec. 27, 2014

(65) Prior Publication Data
US 2016/0188350 A1    Jun. 30, 2016

(51) Int. Cl.
| | |
|---|---|
| *G06F 9/45* | (2006.01) |
| *G06F 9/455* | (2006.01) |
| *H04L 9/32* | (2006.01) |
| *G09C 1/00* | (2006.01) |
| *G06F 21/57* | (2013.01) |
| *G06F 21/74* | (2013.01) |

(52) U.S. Cl.
CPC ........... *G06F 9/4552* (2013.01); *G06F 21/57* (2013.01); *G06F 21/74* (2013.01); *G09C 1/00* (2013.01); *H04L 9/3234* (2013.01); *H04L 9/3247* (2013.01); *H04L 2209/127* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,085,935 B1 * | 8/2006 | Ellison | G06F 12/1491 709/250 |
| 7,443,985 B2 * | 10/2008 | Krishnaswamy | H04L 63/0428 380/278 |

(Continued)

FOREIGN PATENT DOCUMENTS

| | | |
|---|---|---|
| EP | 2759955 A1 | 7/2014 |
| WO | 2013174503 A1 | 11/2013 |

(Continued)

OTHER PUBLICATIONS

International Search Report and Written Opinion in International Application No. PCT/US2015/064378 mailed on Apr. 11, 2016; 9 pages.

(Continued)

*Primary Examiner* — Evral E Bodden
(74) *Attorney, Agent, or Firm* — Patent Capital Group

(57) ABSTRACT

In an example, a computing device may include a trusted execution environment (TEE) for executing signed and verified code. The device may receive a trusted binary object in a first form, but the object may need to be converted to a second format, either on-the-fly, or in advance. This may include, for example, a bytecode interpreter, script interpreter, runtime engine, compiler, just-in-time compiler, or other species of binary translator. The binary translator may be run from the TEE, and the output may then be signed by the TEE and treated as a new trusted binary.

20 Claims, 9 Drawing Sheets

(56) References Cited

U.S. PATENT DOCUMENTS

| | | | |
|---|---|---|---|
| 7,506,155 B1 | 3/2009 | Stewart et al. | |
| 7,984,304 B1 | 7/2011 | Waldspurger et al. | |
| 8,892,676 B2 | 11/2014 | Aszmann et al. | |
| 8,892,876 B1 | 11/2014 | Huang et al. | |
| 9,124,561 B2* | 9/2015 | Saif | H04W 12/04 |
| 2003/0217264 A1* | 11/2003 | Martin | G06F 21/6209 |
| | | | 713/156 |
| 2005/0091530 A1 | 4/2005 | Avraham et al. | |
| 2006/0190935 A1 | 8/2006 | Kielstra et al. | |
| 2006/0294508 A1 | 12/2006 | Berkowits et al. | |
| 2007/0220601 A1* | 9/2007 | Huelsbergen | G06F 21/72 |
| | | | 726/22 |
| 2008/0126801 A1* | 5/2008 | Lee | H04L 9/006 |
| | | | 713/167 |
| 2009/0276631 A1* | 11/2009 | Micali | G06Q 20/02 |
| | | | 713/176 |
| 2009/0282477 A1 | 11/2009 | Chen et al. | |
| 2010/0011209 A1 | 1/2010 | Kiriansky et al. | |
| 2011/0016459 A1 | 1/2011 | Meyers et al. | |
| 2012/0304310 A1 | 11/2012 | Blaisdell | |
| 2012/0331550 A1 | 12/2012 | Raj et al. | |
| 2013/0283042 A1* | 10/2013 | Xiao | G06F 21/33 |
| | | | 713/156 |
| 2014/0075496 A1 | 3/2014 | Prakash et al. | |
| 2014/0283006 A1 | 9/2014 | Korkishko et al. | |
| 2014/0317686 A1 | 10/2014 | Vetillard | |
| 2016/0182531 A1* | 6/2016 | Rubakha | H04L 63/123 |
| | | | 726/1 |
| 2016/0188350 A1* | 6/2016 | Shah | G09C 1/00 |
| | | | 717/148 |
| 2016/0188873 A1 | 6/2016 | Smith et al. | |

FOREIGN PATENT DOCUMENTS

| | | |
|---|---|---|
| WO | 2014021919 A2 | 2/2014 |
| WO | 2016105861 | 6/2016 |
| WO | 2016105927 A1 | 6/2016 |
| WO | 2016105935 | 6/2016 |

OTHER PUBLICATIONS

Asokan et al., "Mobile Trusted Computing", In: proceedings of the IEEE; vol. 102, No. 8, Aug. 2014, pp. 1189-1206.

Final Office Action in U.S. Appl. No. 14/582,173 mailed on Jul. 5, 2016; 25 pages.

Non-Final Office Action in U.S. Appl. No. 14/582,173 mailed on Feb. 1, 2016; 16 pages.

PCT International Search Report and Written Opinion in International Application No. PCT/US2015/062854 mailed on Apr. 25, 2015; 11 pages.

PCT International Search Report and Written Opinion in International Application No. PCT/US2015/064578 mailed on Apr. 8, 2016; 9 pages.

USPTO Office Action in U.S. Appl. No. 14/583,620 mailed on Aug. 4, 2016; 17 pages.

USPTO Final Office Action issued in U.S. Appl. No. 14/583,620 on Jan. 30, 2017; 24 pages; 24 pages.

USPTO Non-Final Office Action in U.S. Appl. No. 14/582,173 mailed on Dec. 1, 2016; 30 pages.

USPTO Final Action issued in U.S. Appl. No. 14/582,173 on Mar. 23, 2017; 31 pages.

* cited by examiner

TRUSTED BINARY TRANSLATION

FIELD OF THE DISCLOSURE

This application relates to the field of computer security, and more particularly to a system and method for trusted binary translation.

BACKGROUND

Computer security is an ever-evolving arms race between malicious actors on the one hand, and computer security firms and users on the other hand. One useful tool on the security side of this race is the "trusted execution environment" (TEE). A TEE is a combination of hardware, software, and firmware that provides an environment for executing signed and verified binaries or other executable objects. A TEE may include a processor with suitable extension instructions, such as the Intel® secure guard extension (SGX) instructions, a security coprocessor, appropriate firmware and drivers, and/or a special memory "enclave." An enclave includes a special memory page or partition that can only be accessed and referenced via special TEE instructions. In particular, a program may write to or read from memory locations within the enclave, or execute instructions within the enclave, only by way of special instructions like Intel® SGX instructions. Any attempt to enter the enclave with other (nonsecure) instructions may result in an error such as a page fault.

In one example, a TEE is configured to execute only objects that are verified and signed, such as by a certificate authority. This helps to ensure that malware and other malicious objects are not executed within the TEE. In some examples, the TEE is given exclusive access to certain sensitive or important resources, such as important operating system files, sensitive data, or other protected resources. An enclave may be used to isolate trusted code, operating on confidential data, from the rest of a computing device, which may run untrusted code.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
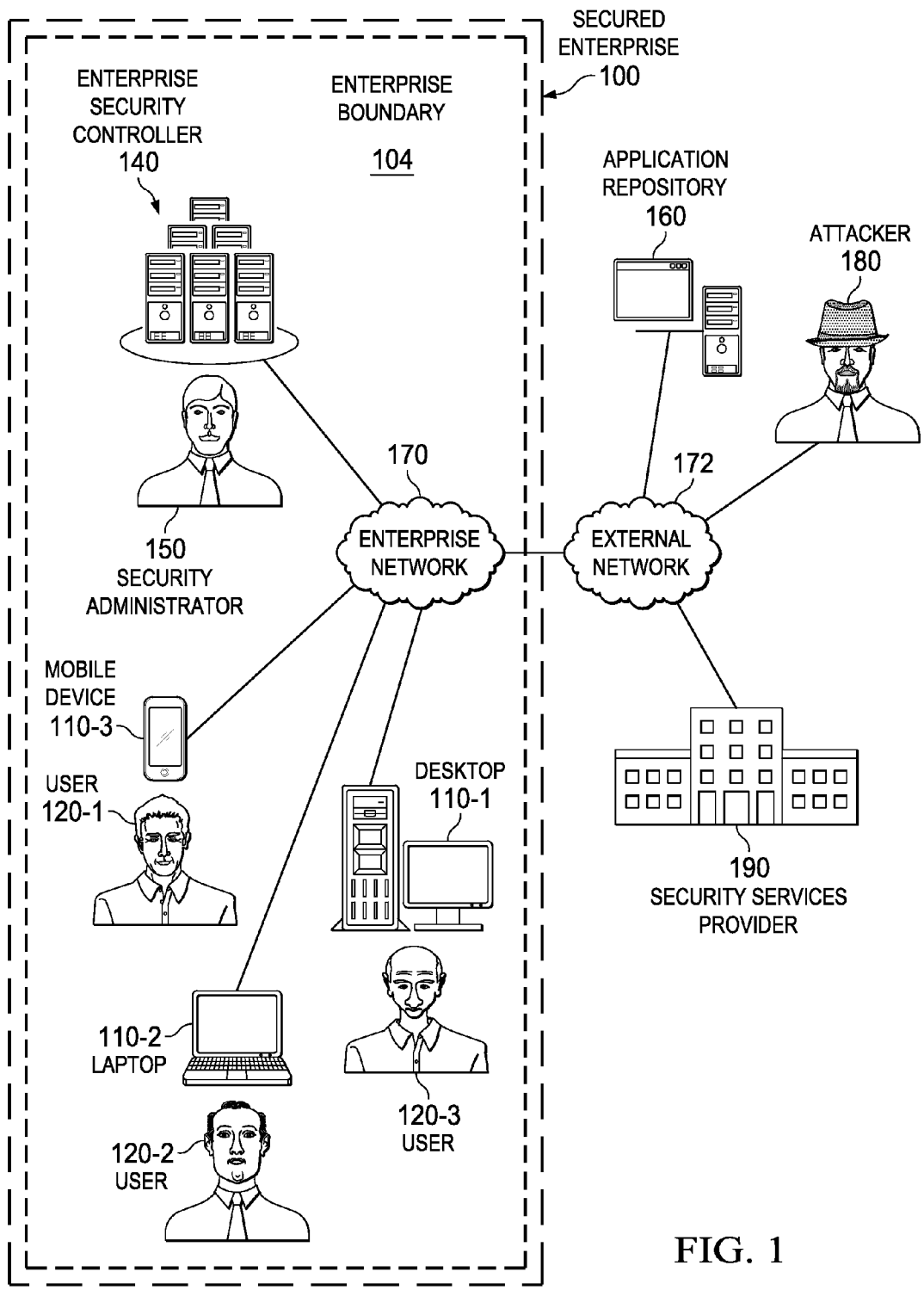
FIG. 1 is a block diagram of a security-enabled network according to one or more examples of the present Specification.

In an example, a computing device may include a trusted execution environment (TEE) for executing signed and verified code. The device may receive a trusted binary object in a first form, but the object may need to be converted to a second format, either on-the-fly, or in advance. This may include, for example, a bytecode interpreter, script interpreter, runtime engine, compiler, just-in-time compiler, or other species of binary translator. The binary translator may be run from the TEE, and the output may then be signed by the TEE and treated as a new trusted binary.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

Code signing and verification are fundamental building block in certain secure computing architectures. They help to verify that code or a binary built by a developer or independent software vendor (ISV) hasn't been tampered with on its way to its consumer, thus guaranteeing software integrity and building a trusted channel between them. This channel, however, typically only extends up to software installation time. Sophisticated TEES may go one step further and verify the software integrity up to the point of execution. However, they may not extend to use cases when the code/binary has to be legitimately modified, like binary translation, just-in-time compilation or when managed runtimes come into play.

In an example of the present specification, a TEE may include one or both of a binary translation engine (BTE) and input verification engine (IVE). The BTE and IVE may operate independently of one another to perform their specific functions, or may work cooperatively to provide joint functions.

The BTE may be configured to receive a first object called a trusted binary, which may be for example, a binary object, a text file, a script, a macro, or any other suitable object that has been previously analyzed and validated. The trusted binary may appear on a white list for the TEE, meaning that the trusted binary is permitted to execute within the TEE. The trusted binary may have a certificate signed by a certificate authority, including a public key, which can be verified by a private key. However, the trusted binary may not be suitable for use in its original form on a target system. In one nonlimiting example, the trusted binary is a Java byte code binary, which can be executed only by a Java virtual machine.

The increasing use of mobile devices and mobile operating systems complicates the security posture for such trusted binaries. For example, the Java byte code may not be suitable for use on a particular architecture, or it may be desirable to convert the Java byte code to a new form that is suitable for use on a mobile device. In one embodiment, the Java byte code is to be compiled to native instructions for suitable mobile devices. However, the compilation may include several target devices on different architectures, such as Intel x86-based architectures, ARM architectures, or others. Using these binaries on a mobile device may require compiling the byte code into each separate native format, and then individually signing the output of each compilation. While this is possible, it may be cumbersome.

In another example, binary translation does not occur until after the first object arrives on a target device. For example, the BTE may be a just in time (JIT) compiler, which compiles the Java byte code on-the-fly into a native binary format. In that case, the binary cannot be signed by a certificate authority beforehand. In an embodiment where the TEE will execute only signed and verified binaries, this means that the output of the JIT compiler must be run outside of the TEE. This may defeat the security purposes of the TEE, or render the binary completely useless.

In one example of the present specification, a system and method are described wherein the BTE itself is trusted binary that can be run in whole or in part within the TEE. When the TEE receives a first signed object in a first format, the BTE may translate the first signed object into a second object in a second format. For example, the second format may be a native binary format for the host platform. Because the first signed object and the BTE are both signed and verified, it is reasonable to assume that the output of the BTE (processing the first signed object as an input) can also be treated as a trusted binary. Thus, the TEE itself may sign the second object, which is the output of the BTE. Signing the second object may include signing it with the same key that was used to sign the first signed object, or with a second key that is different from the first key, but has the same provenance as the first key. The second binary is then suitable for execution within the TEE on the host system.

Furthermore, the BTE may be configured to export the second object from the TEE in a signed and encrypted form. Because the second object has now been signed by the first key, or by a second key having the same provenance as the first key, it can be provided to another machine with a TEE, and the other machine can recognize the certificate of the second object as valid. In one example, this may include performing an attestation between the first machine and second machine.

This may be particularly useful in an Internet of things (IoT) context, wherein individual IoT devices do not have sufficient processing capabilities to perform on-the-fly binary translation. In some cases, the devices may not even be able to provide a TEE of their own. Rather, they may sit behind a gateway that provides a TEE, and that allows instructions to pass through to the device only if it is a signed and trusted binary. Thus, in that context, the device itself may be treated as a TEE. This may be further facilitated by trusted boot mechanisms or other existing security devices.

In the context of mobile devices, additional complications may be encountered in the area of input verification. In many cases, the security of an application or other binary object is only as good as the security of its inputs. Thus, even an application executing within a TEE may be compromised if proper input verification is not performed. Furthermore, in some cases, an entire application need not be provided within the TEE. In one example, the popular Android operating system uses Java as a primary programming language and platform for apps. In some cases, it may not be necessary to run an entire app within a TEE on a mobile device, but it may be desirable to run a trusted, verified, and signed input verification engine (IVE) within the TEE, to ensure that inputs to the app are valid and suitable. Input verification may prevent, for example, common problems such as buffer overruns and invalid inputs.

Thus, in one embodiment of the present specification, an IVE is provided, and may be run within a TEE. The IVE may include such functional blocks as a secure network stack, a secure graphics engine, a secure human interface device (HID) engine, a secure audio output engine, a secure image processing engine, a secure telemetry engine, and secure GPS receiver.

The various functional blocks of the IVE may be provided to verify, sanitize, and otherwise condition inputs from the user, from the network, from sensors and devices, or from other binary objects. Once the inputs are properly verified and/or sanitized, they may be compiled into a verified input packet. The verified input packet may be encrypted within the TEE, and signed by the TEE. The verified input packet is then exported out of the TEE, and provided to a suitable interface, such as the Java native interface (JNI) wrapper. The JNI wrapper may then provide the encrypted, signed, and verified inputs to an ordinary Java application. Because the inputs are encrypted, they will not be intercepted by malware or other malicious objects, and because they have been verified by IVE, they can be trusted by the application.

In one example, the IVE may also include an interface to the BTE, so that in some cases, a trusted binary may be vetted by the IVE before being passed to the BTE.

Advantageously, while the IVE itself may need to provide native or lower-level instructions, such as in C, C++, or assembly language, the application ISV may not need to be familiar with those languages to use the IVE once the functional blocks have been built, for example by a security firm. Rather, the functional blocks can be provided as a "black box" implementation, so that the programmer needs only know the appropriate prototypes and interfaces for calling the functions from his application, such as a Java application.

In one embodiment, the programmer may use common Java attributes to inform the TEE of how to verify the inputs. Thus, the programmer may have the flexibility to configure the input verification without needing to write input verification routines himself. Also advantageously, the input verification routines are themselves signed and verified binaries that can execute within the TEE, so the input verification can be performed on a trusted basis.

A system and method of the present Specification will now be described with more particular reference to the attached FIGURES FIG. 1 is a network-level diagram of a secured enterprise 100 according to one or more examples of the present Specification. In the example of FIG. 1, a plurality of users 120 operate a plurality of client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Apple iOS, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

One or more computing devices configured as an enterprise security controller (ESC) 140 may also operate on enterprise network 170. ESC 140 may provide a user interface for a security administrator 150 to define enterprise security policies, which ESC 140 may enforce on enterprise network 170 and across client devices 120.

Secured enterprise 100 may encounter a variety of "security objects" on the network. A security object may be any object that operates on or interacts with enterprise network 170 and that has actual or potential security implications. In one example, object may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Enterprise security policies may include authentication policies, network usage policies, network resource quotas, antivirus policies, and restrictions on executable objects on client devices 110 by way of non-limiting example. Various network servers may provide substantive services such as routing, networking, enterprise data services, and enterprise applications.

Secure enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172.

It may be a goal of users 120 and secure enterprise 100 to successfully operate client devices 110 without interference from attacker 180 or from unwanted security objects. In one example, attacker 180 is a malware author whose goal or purpose is to cause malicious harm or mischief. The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this Specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a client device 110. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for ISVs to occasionally provide updates or patches that repair vulnerabilities as they become known. However, from a security perspective, these updates and patches are essentially new Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 190 to distribute overtly malicious software, attacker 190 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 120.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions.

Various computing devices may also interoperate with a certificate authority 184, which may be a trusted third party. Certificate authority 184 may issue digital certificates for signing parties. A software package, for example, may be accompanied by a signature or assertion made by a private key that corresponds to a certified public key. This may be used to verify the identity of an ISV, and to verify that a binary object has not been tampered with.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Collectively, any object that is or can be designated as belonging to any of the foregoing classes of undesirable objects may be classified as a malicious object. When an unknown object is encountered within secured enterprise 100, it may be initially classified as a "candidate malicious object." This designation may be to ensure that it is not granted full network privileges until the object is further analyzed. Thus, it is a goal of users 120 and security administrator 150 to configure and operate client devices 110 and enterprise network 170 so as to exclude all malicious objects, and to promptly and accurately classify candidate malicious objects.

One purpose of using a TEE is that it is very difficult for a candidate malicious object to pass security validation and get signed as a trusted binary. Thus, an object executed within a TEE need not be treated as a candidate malicious object, while objects encountered outside of the TEE may be treated as candidate malicious objects by default until they have been validated or cleared.

Figure 2:
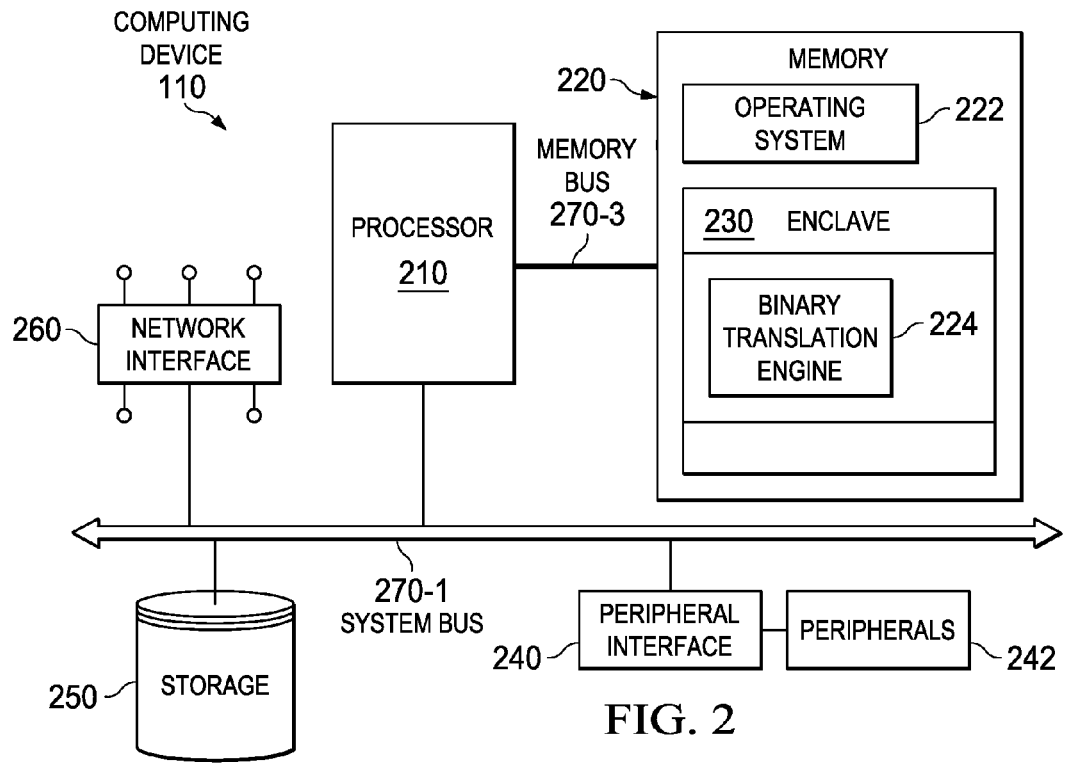
FIG. 2 is a block diagram of a computing device according to one or more examples of the present Specification.

FIG. 2 is a block diagram of client device 110 according to one or more examples of the present Specification. Client device 110 may be any suitable computing device. In various embodiments, a "computing device" may be or comprise, by way of non-limiting example, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data Client device 110 includes a processor 210 connected to a memory 220, having stored therein executable instructions for providing an operating system 222 and at least software portions of a BTE 224 and IVE 460. Other components of client device 110 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In one example, an enclave 230 is defined within memory 220 to provide a TEE as described herein. In one example, enclave 230 includes a BTE 224 and IVE 460.

In various examples, a "processor" may include any combination of logic elements, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security engine 224. Many other configurations are also possible, and are intended to be encompassed within the broad scope of this Specification.

Network interface 260 may be provided to communicatively couple client device 110 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

BTE 224 and IVE 460, in one example, are operable to carry out computer-implemented methods according to this Specification. BTE 224 and IVE 460 may include one or more non-transitory computer-readable mediums having stored thereon executable instructions operable to instruct a processor to provide suitable functions. As used throughout this Specification, an "engine" includes any combination of one or more logic elements, of similar or dissimilar species, operable for and configured to perform one or more methods provided by the engine. Thus, security engine 224 may comprise one or more logic elements configured to provide security engine methods as disclosed in this Specification. In some cases, an engine may include a special integrated circuit designed to carry out a method or a part thereof, and may also include software instructions operable to instruct a processor to perform the method. In some cases, an engine may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that engines may also include other hardware and software, including configuration files, registry entries, and interactive or user-mode software by way of non-limiting example.

In one example, BTE 224 and IVE 460 include executable instructions stored on a non-transitory medium operable to perform a method according to this Specification. At an appropriate time, such as upon booting client device 110 or upon a command from operating system 222 or a user 120, processor 210 may retrieve a copy of the appropriate engine (or software portions thereof) from storage 250 and load it into memory 220. Processor 210 may then iteratively execute the instructions of the engine to provide the desired method.

Peripheral interface 240 may be configured to interface with any auxiliary device that connects to client device 110 but that is not necessarily a part of the core architecture of client device 110. A peripheral may be operable to provide extended functionality to client device 110, and may or may not be wholly dependent on client device 110. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 3:
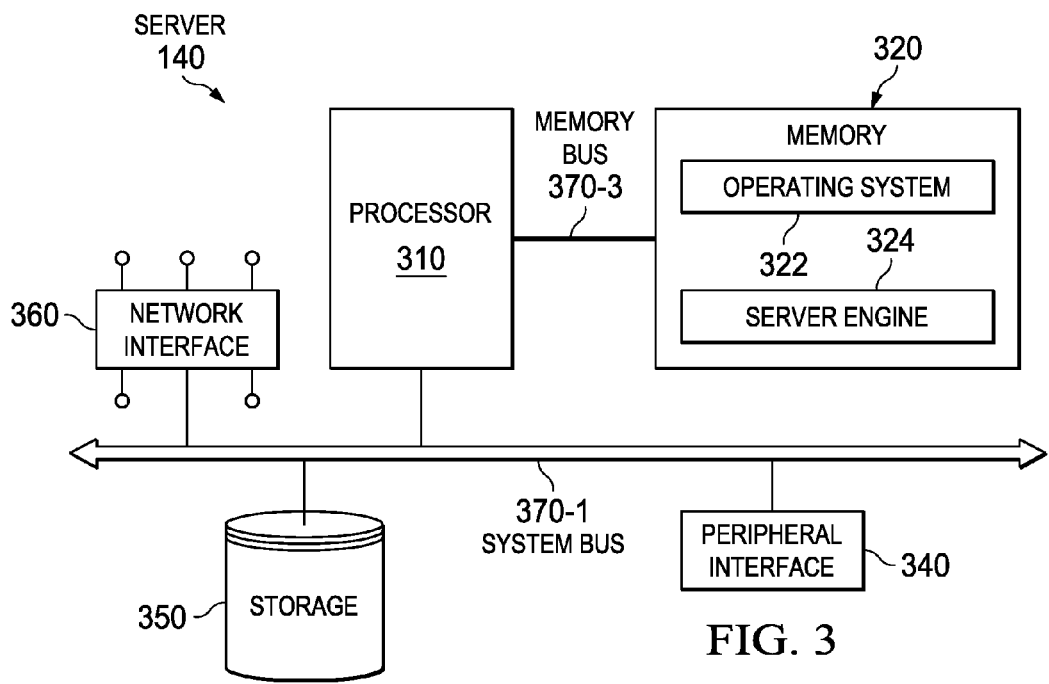
FIG. 3 is a block diagram of a server according to one or more examples of the present Specification.

FIG. 3 is a block diagram of server 140 according to one or more examples of the present Specification. Server 140 may be any suitable computing device, as described in connection with FIG. 2. In general, the definitions and examples of FIG. 2 may be considered as equally applicable to FIG. 3, unless specifically stated otherwise. Server 140 is described herein separately to illustrate that in certain embodiments, logical operations according to this Specification may be divided along a client-server model, wherein client device 110 provides certain localized tasks, while server 140 provides certain other centralized tasks.

Server 140 includes a processor 310 connected to a memory 320, having stored therein executable instructions for providing an operating system 322 and at least software portions of a server engine 324. Other components of server 140 include a storage 350, network interface 360, and peripheral interface 340. As described in FIG. 2, each logical block may be provided by one or more similar or dissimilar logic elements.

Processor 310 may be any suitable processor. In certain embodiments, processor 310 may be a server-class processor or processing array, comprising multiple cores and/or multiple processors. In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2.

Server engine 324 is an engine as described in FIG. 2 and, in one example, includes one or more logic elements operable to carry out computer-implemented methods, including providing security functions for secured enterprise 100. This may include initial vetting and validation of binaries, which may be signed and provided as trusted binaries to client devices 110. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 222 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Peripheral interface 340 may be configured to interface with any auxiliary device that connects to server 140 but that is not necessarily a part of the core architecture of server 140. A peripheral may be operable to provide extended functionality to server 140, and may or may not be wholly dependent on server 140. Peripherals may include, by way of non-limiting examples, any of the peripherals disclosed in FIG. 2.

Figure 4A:
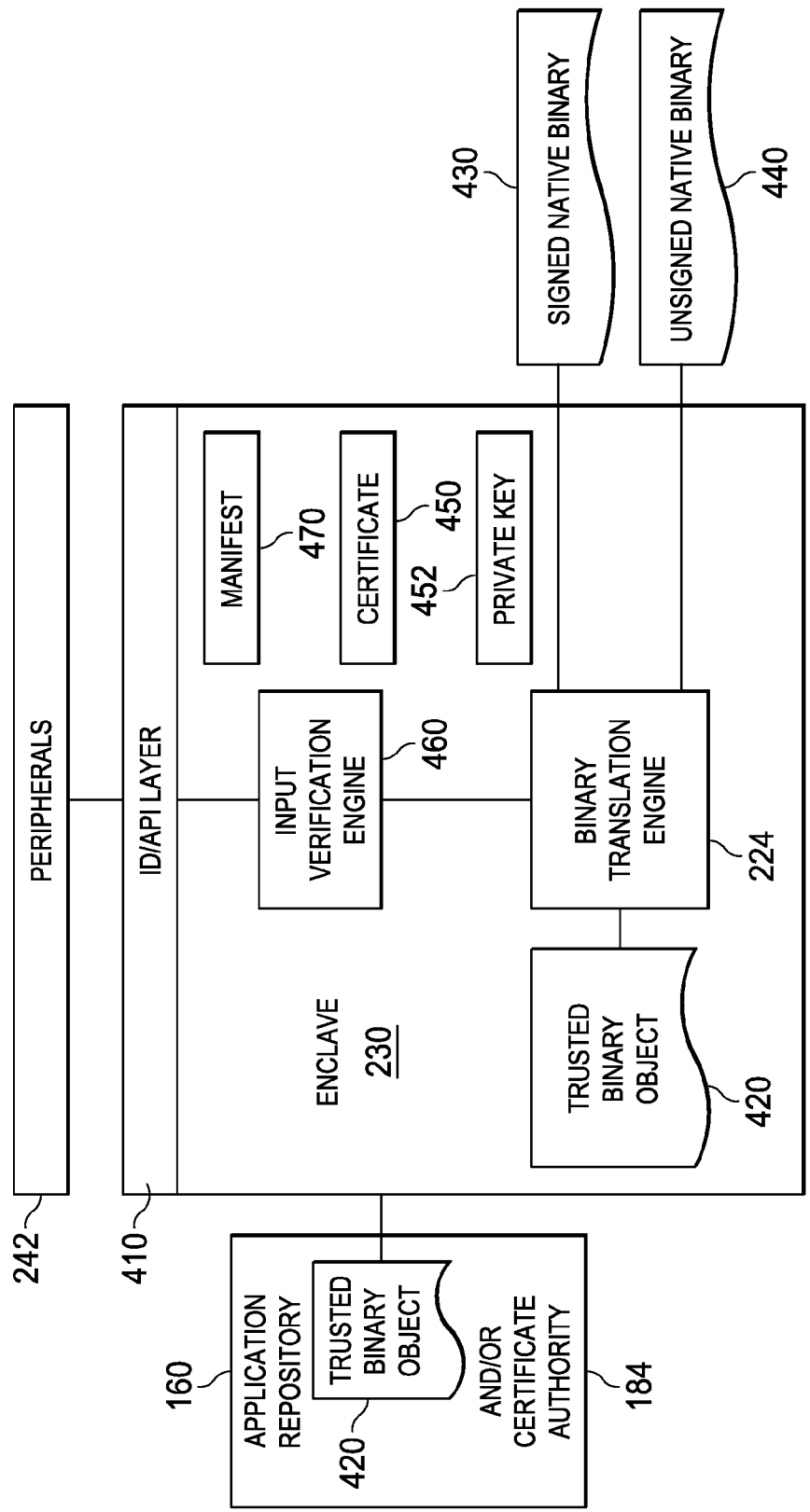
FIGS. 4A and 4B are functional block diagrams of an enclave according to one or more examples of the present Specification.

FIG. 4A is a functional block diagram of selected elements of the present specification.

In summary, binary translation such as compilation, interpretation, or translation may be performed on a client device 110 within a TEE provisioned with ISV's public key. The TEE may then use the public key, or a key with the same provenance, to sign the derived code produced.

Thus, a trusted channel is provided that guarantees software integrity by code signing and verification in a TEE, and by validation mechanisms such as remote attestation.

This may be accomplished by a three-phase method, in which the second phase bridges the first and third phase, as follows:

The ISV or developer compiles and signs the code into an intermediate representation (trusted binary object 420), which is delivered to client device 110.

On client device 110, an enclave 230 is provisioned to perform the methods of this Specification. Within enclave 230, the ISV's signature is verified. Trusted binary object 420 is then compiled, translated, or otherwise modified by BTE 224 to produce a second object in a second format. Depending on the ISV's preference for propagating the chain of trust for the signature, a key specified in trusted binary object 420, a key securely provisioned on demand, or a new locally generated key may be obtained. The TEE signs the second object with this second key.

The TEE verifies the integrity of the derived code by verifying the signature before executing it.

Options for signing the second binary in phase 2 above may include the following:

When the ISV compiles and signs the code with the first key, he may bundle or include a second key to be used for signing the second object. Since the key for trusted binary object 420 is trusted and verified, the second key may also be trusted.

The ISV may provision the second signing key to enclave 230. There may be variations in this implementation. Enclave 230 could periodically query, for example, security services provider 190 or enterprise security controller 140 to pull in second keys for various ISVs and store them locally (using secure storage capabilities of SGX or similar technology). It could alternatively look up the key for the ISV whose code/binary it is about to process. It could do this look up at either a central service that has this assembled or it could look up the ISV's service directly at a pre-determined location.

A new key-pair may be generated locally, specifically for the purpose of signing the derived code. Enclave 230 may upload the new key-pair to a service (either a central service such as certificate authority 184 or one operated by the ISV) if it wants to enable remote signature verification. Otherwise, it could update its local signature database to provide verification.

The first two examples above use the remote attestation capabilities of enclaves whenever there is any communication with a central service or an ISV-owned service. They may also use local attestation capabilities of enclaves for communication locally across enclaves, e.g., when adding a locally generated key to a local key-store of enclave 230.

There may also be provided a revocation path or key rotation process that automatically refreshes the signing key or notifies certificate authority 184 to refresh the key. For example, BTE 224 may consult a revocation or expiration list before signing the binary.

In certain embodiments, phase 2 above could be repeated one or more times with variations in tools/technologies before proceeding to phase 3. The simplest case is that a single key is used for all iterations of phase 2. Alternatively, device-specific, tool-specific, or application-specific keys may be propagated down, or new key-pairs may be generated and uploaded with a certificate signing request to certificate authority 184, or an ISV verification service.

This may extend back to source control as well, such that the chain of trust could extend all the way from a specific signed versioning system tag (such as a Git tag) down to a platform-specific dynamically-signed binary. At each translation layer the newly signed binary may include an attestation of the entity that did the translation (e.g. BTE 224 of enclave 230) so that both the origin of the code and the toolchain entities involved in generating trusted binary object 420 may be verified.

In one example, application repository 160 and/or certificate authority 184 may provide a trusted binary object 420. For example, an ISV may provide an application via application repository 160, and the application may be signed and verified by certificate authority 184. Application repository 160 then provides trusted binary object 420 to a client device 110.

Trusted binary object 420 is provided to enclave 230. Enclave 230 may be provided in any suitable client device 110, or in certain embodiments in enterprise security controller 140. It should be noted also that enclave 230 is only one part of a TEE as described herein.

In one example, enclave 230 includes an interface definition (ID) and application programming interface (API) layer 410. ID and API layer 410 may provide appropriate interfaces for communicatively coupling to peripherals 242.

Enclave 230 also includes BTE 224 and IVE 460. In this example, IVE 460 is communicatively coupled to BTE 224, so that BTE 224 can receive signed and validated inputs from peripherals 242. Enclave 230 may also include a manifest 470, certificate 450 (which may include a public key that was used to sign trusted binary object 420), and a private key 452.

In certain embodiments, code validation performs an integrity check on code loaded into a TEE. Manifest 470 may be a whitelist describing acceptable code or a blacklist describing unacceptable code. The Manifest may be signed by a trusted domain (such as an enterprise IT department, or original equipment manufacturer) using a key that was provisioned by the domain.

The Manifest and Code Validation operations may be applied when the TEE initializes, at boot time, at TEE software/firmware update time or when a new code object is added to or removed from a TEE. In some example, "Trusted Boot" and "Secure Boot" are industry terms that refer to at least some of the above initialization steps.

In one example, the binary translation engine is part of the image loaded into the TEE and therefore is subject to trusted boot policies that may detect attacks on BTE and IVE components.

It should be noted that in some cases, particularly in IoT, sensors, actuators, or wearable device contexts, an entire device may be considered a TEE after a secure boot operation.

It may be necessary to translate trusted binary object 420 from a first format into a second format. For example, trusted binary object 420 may be Java byte code, which needs to be compiled into a native binary format by an ahead of time compiler. In another example, trusted binary object 420 may be a Java byte code program that will be compiled by a just-in-time compiler. In yet other examples, BTE may be any of a runtime engine, an interpreter, a just-in-time compiler, ahead-of-time compiler, a virtual machine (such as the Java Virtual Machine (JVM)), a compiler, a linker, and a toolchain utility by way of non-limiting example. One purpose of BTE 224 may be either to provide a binary object for real-time use within enclave 230 to be stored, for example on storage 250 of FIG. 2, or to be provided to another computing device.

In one example, BTE 224 receives trusted binary object 420, as well as any necessary input from IVE 460, and produces a signed native binary 430. Signed native binary 430 may be signed by private key 452, which may have the same provenance as the key that was used to sign trusted binary object 420. In another example, private key 452 may be the same key that was used to sign trusted binary object 420. This is possible only if trusted binary object 420 carries the key itself with it.

Because BTE 224 is also a signed and trusted binary executing within enclave 230, and because trusted binary object 420 is also a signed and verified object, it is reasonable to assume that signed native binary 430 can also be treated as a binary. Therefore, signed native binary 430 may be treated as a trusted binary object, similar to trusted binary object 420. Thus, signed native binary 430 may be used within enclave 230, or may be provided to some other computing device with a TEE capability.

Unsigned native binary 440 may also be produced, and may include the exact same binary object as signed native binary 430. However, unsigned native binary 440 is not signed by private key 452. Unsigned native binary 440 may be provided to computing devices that do not have TEE capabilities. For example, in an IoT context, unsigned native binary 440 may be provided to an Internet capable device or sensor, which may not have TEE capabilities. However, in some cases, IoT devices may have secure boot capabilities, so that the entire device can be treated as a TEE. In other examples, IoT devices without TEE capabilities may be placed behind a Gateway with TEE capabilities, which may verify signed native binary 430, strip out TEE attributes thereof, and provide unsigned native binary 440 to the IoT device. Many other possibilities are also available.

Figure 4B:
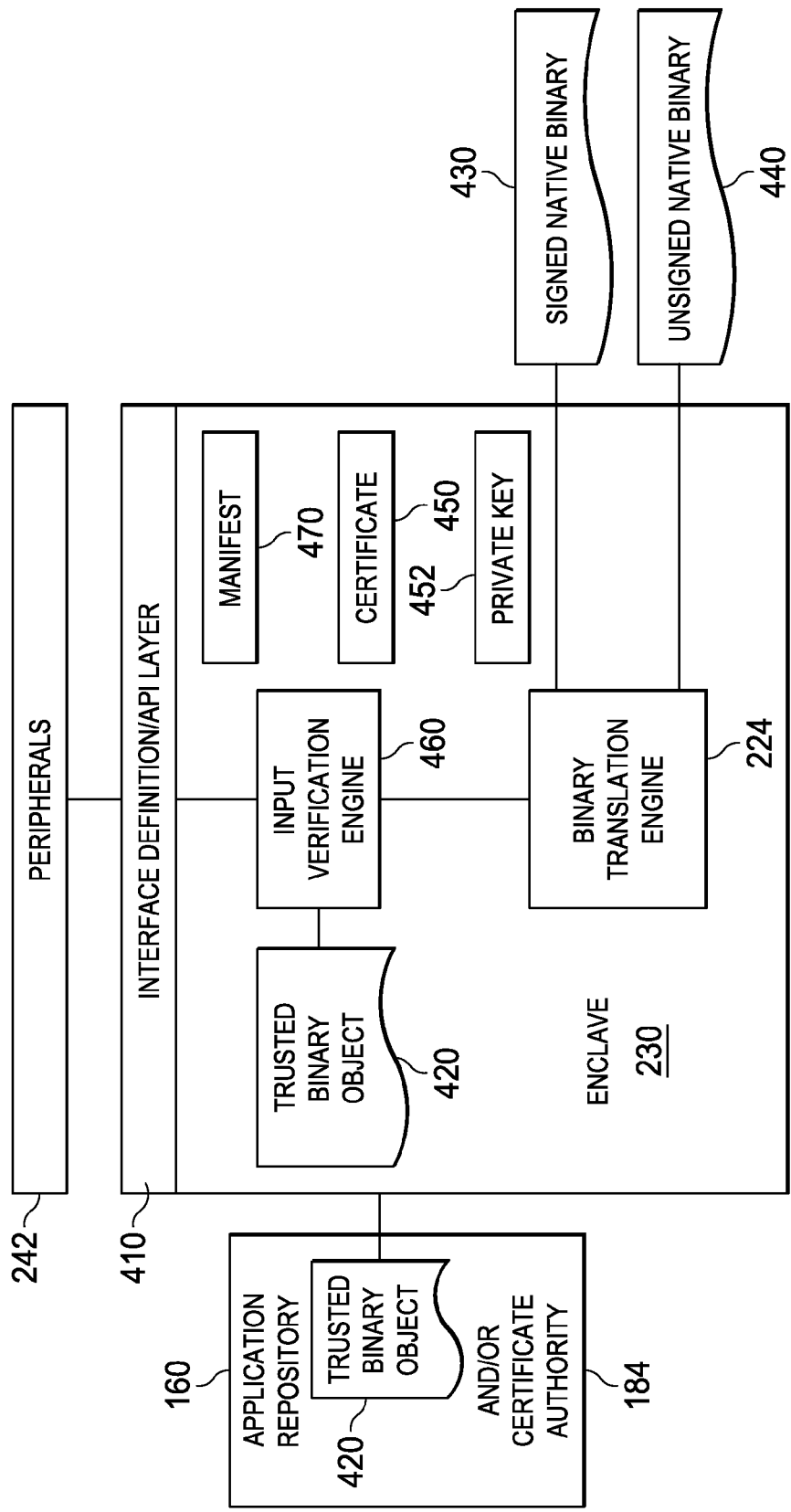

FIG. 4B is a second functional block diagram of selected elements of the present specification. In the example of FIG. 4B, enclave 230 is again provided, with the same elements as enclave 230 of FIG. 4A. However, in this case, trusted binary object 420 is not provided directly to BTE 224. Rather, trusted binary object 420 is provided to IVE 460, which treats trusted binary object 420 as an input, similar to inputs from other sources. IVE 460 may then analyze trusted binary object 420 and tag appropriate portions for execution within enclave 230, as is described in more detail in FIG. 6. IVE 460 may then provide validated input packets to BTE 224. BTE 224 may then perform its binary translation function, including designating tagged portions for execution within enclave 230, and provide one or both of signed native binary 430, and unsigned native binary 440.

Figure 5:
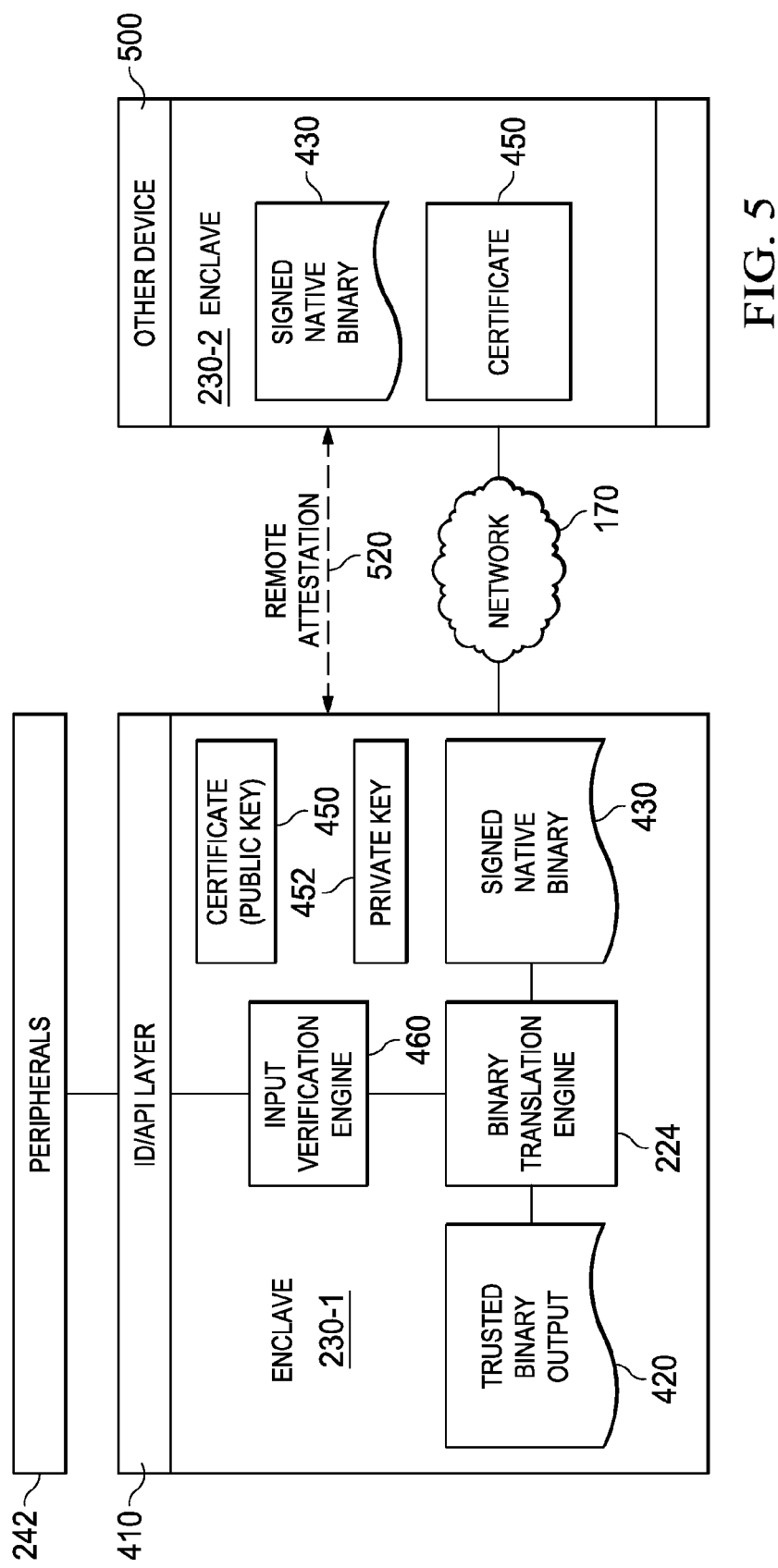
FIG. 5 is a functional block diagram of interchange of signed binaries by a pair of enclaves according to one or more examples of the present Specification.

FIG. 5 is a functional block diagram of selected elements of the present specification. In this case, a first computing device includes enclave 230-1, while a second computing device includes enclave 230-2. In this example, enclave 230-1 first receives trusted binary object 420. Enclave 230-1 may be configured as shown in FIG. 4A, as shown in FIG. 4B, or in any other suitable configuration. As before, BTE 224 generates signed native binary 430. This may be signed in one example by a public key provided with certificate 450.

Enclave 230-1 may provide signed native binary 430 to enclave 230-2 via network 170. In this example, enclave 230-2 is provided on other device 500.

Other device 500 may wish to use signed native binary 430, and may thus engage in a remote attestation 520 with enclave 230-1. With remote attestation 520, other device 500 may verify that certificate 450 is a valid certificate generated or provided by enclave 230-1. Thus, other device 500 may then treat signed native binary 430 as a trusted binary, and in particular, signed native binary 430 may become a trusted binary object 420 for other device 500.

Figure 6:
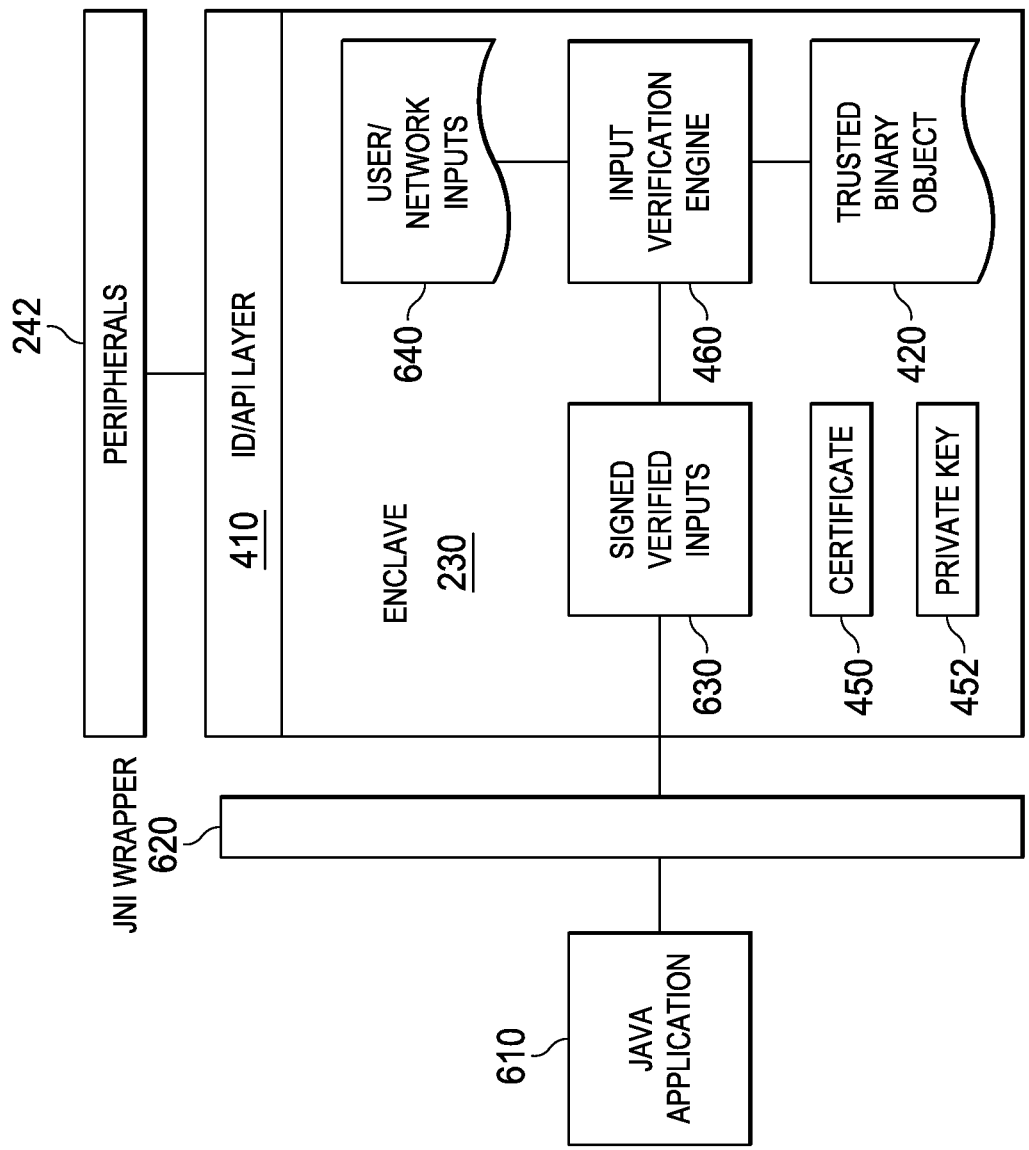
FIG. 6 is a functional block diagram of an enclave according to one or more examples of the present Specification.

FIG. 6 is a functional block diagram of selected elements of the present specification. FIG. 6 describes an IVE 460 with more particularity.

In summary, a TEE may provide an API to allow userspace applications to interact with enclave 230. For example, the Intel® SGX software development kit (SDK) provides a C/C++ API to instantiate an enclave 230 and provide native C/C++ software within enclave 230.

An Android application may need to access sensitive data and perform input validation, such as verify that valid characters were entered by a user into fields like birth date, email address, phone, or social security number. Input validation may require communicating with an appropriately configured server (such as enterprise security controller 140), thus potentially exposing sensitive data to malicious eyes, or instantiating an enclave 230, thus requiring the ISV to be skilled in input validation.

However, Android applications are commonly written in Java code. So to secure parts of an Android application with SGX, the ISV may reimplement the protected part of the application in C/C++, wrap it in the Java Native Interface (JNI) wrapper, and call the JNI interface from the Android application.

In one example, a different ISV, such as security services provider 190, may provide a number of pre-built native C/C++ input verification modules as part of an IVE 460. These may be built to take advantage of enclave 230 and to operate within a TEE to provide trusted input verification.

Thus, an Android ISV, for example, may be able to build an app using the input verification modules as building-blocks to perform common tasks such as communicate with a web-server using a secured network stack, output data to a screen using a secure graphics engine, and receive an input from a user using a secured touch screen input engine.

When sensitive data leave the protected boundaries of enclave 230, they may be encrypted. These secure data will thus not be exposed in plain form outside to other applications. This allows the Android app to run in a potentially malicious environment (including many candidate malicious objects) without risking sensitive data.

In another example, an IVE 460 of the present Specification may allow Android ISVs, for example, to designate a part of their application code to access sensitive data coming from a protected input (such as a touch screen), and to validate the input without compromising the data. In one example, IVE 460 may run in an auto-generated enclave 230 that uses a JVM to execute the Java code. The ISV may thus perform input validation on sensitive data using the same tools and language that he uses to create the Android application itself.

In another example, IVE 420 may analyze a binary object such as trusted binary object 420 or another binary object, and annotate variables that receive sensitive data. IVE 420 may then trace all code that accesses those variables, and require that code to run inside enclave 230. This may include a "pseudo-compilation" to ensure that marked Java code does not perform any prohibited calls or operations that are not permitted within enclave 230, such as accessing the file system or performing system calls. Any such attempt may be flagged with an error code, which can be provided to the ISV so that he can fix the problem.

The ISV may also markup application source code with a special tag, including specific classes, functions, or variables that access sensitive data. ISV 460 may then automatically mark all relevant code, and run that Java code inside a JVM 680 within enclave 230. The relevant inputs may then be communicated seamlessly to Java application 610 as signed verified inputs 630.

Thus, the ISV may be able to define which parts of the Android application should access sensitive data and thus run inside an enclave, using the same tools he uses to develop the Android app itself, and the protected code may still be a Java code. This allows ISVs to implement their own input data validation functionality using Java code without the pitfalls of C/C++, which they may not be as familiar with, and which provide them substantially more rope with which to hang themselves.

In one example, IVE 460 includes a pre-compiler that auto-generates enclave 230, including JVM 680. This may be, in one example, a limited or trimmed JVM, providing only basic functionality to process and verify inputs. Annotated Java code may generate JNI wrappers, parameter converters, and other tools to enable enclave calls and callbacks.

In one example, enclave 230 may receive certain user or network inputs 640 from peripherals 242 via ID/API layer 410. Those inputs may then be provided to IVE 460. In this example, IVE 460 also receives trusted binary object 420. In one example, IVE 460 may engage in an attestation exchange, such as remote attestation 520 of FIG. 5 to validate trusted binary object 420. IVE 460 may then "pseudo-compile" trusted binary object 420 and insert appropriate tags into classes, functions, or variables that perform protected input operations. Thus, when BTE 224 creates a new binary, only a portion of the new binary may be configured to run within enclave 230.

In this example, a Java application 610 is also provided. Java application 610 may be configured to operate on sensitive data, or may otherwise be security critical. Thus, it is desirable to validate inputs for Java application 610.

It may be advantageous to provide for the ISV of Java application 610 an IVE 460, which may support several validation methods. This allows Java application 610 to perform input validation, either by providing a customized Java routine that runs in JVM 680 of enclave 230, or by using one of several pre-built C/C++ input validation tools provided by IVE 460.

JNI wrapper 620 is a standard Java wrapper that enables Java application 610 to interface with methods provided in IVE 460. It should also be noted that JNI wrapper 620, Java application 610, JVM 680, and other Java-specific elements are provided by way of nonlimiting example only. In a more general sense, JNI wrapper 620 may be any suitable wrapper or interface that enables code in a first programming language to interoperate with code from a second programming language. JVM 680 may be any suitable interpreter engine, such as a virtual machine, scripted interpreter, scripting engine, translator, or similar.

In one example, IVE 460 receives user or network inputs 640 from peripherals 242. IVE 460 may also receive trusted binary object 420, and tag trusted binary object 420 appropriately.

IVE 460 may then provide signed and verified inputs 630 for use with Java application 610. JNI wrapper 620 enables Java application 610 to receive signed verified inputs 630 from IVE 460. Java application 610 may then act on signed and verified inputs 630 with confidence that the inputs are valid and not malicious.

Figure 7:
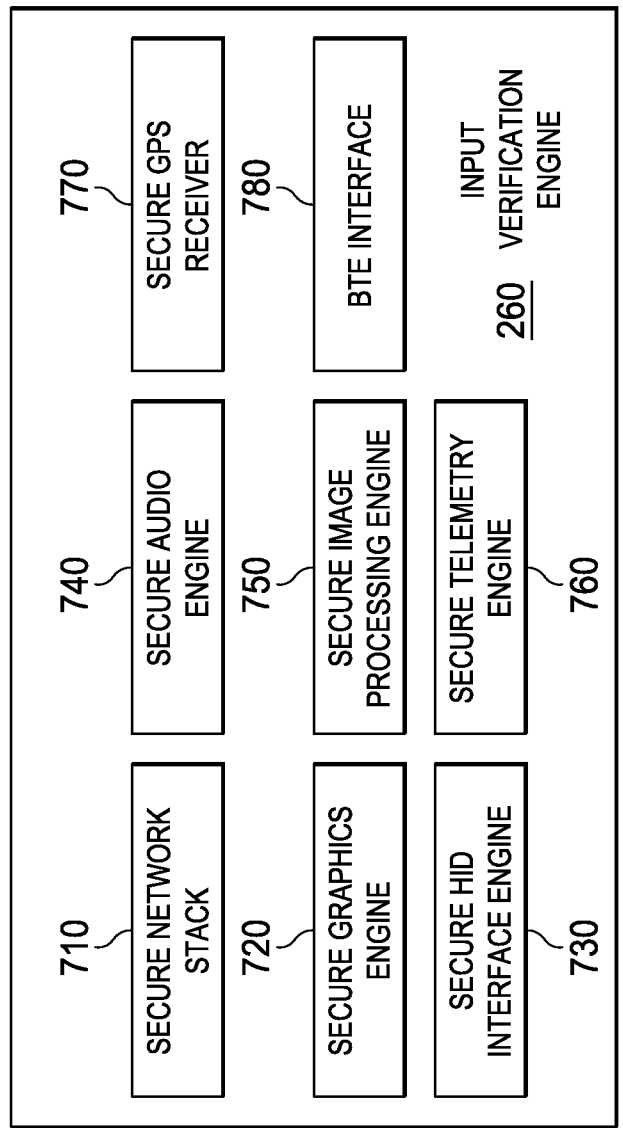
FIG. 7 is a functional block diagram of an input verification engine according to one or more examples of the present Specification.

FIG. 7 is a functional block diagram of an IVE 260. In the example of FIG. 7, certain functional blocks are shown by way of non-limiting example. IVE 260 may have zero or more of the blocks shown, and may have zero or more additional blocks to provide other functions.

In this example, IVE 260 provides a secure network stack 710, a secure graphics engine 720, a secure human input device (HID) interface engine 730, a secure audio engine 740, a secure image processing engine 750, a secure telemetry engine 760, a secure GPS receiver 770, and a binary input analyzer 780.

In one example, secure network stack 710 may provide secure communication over a number of different channels. Communication may be over an IP network, a telephony network, a Wi-Fi network, a Bluetooth network, a local wired or wireless network, or any other suitable network. In one example, secure network stack 710 may provide encrypted communication, for example over HTTPS. Secure network stack 710 may also perform validation of packets sent over or received from the network.

Secure graphics engine 720 may securely drive outputs to a screen or other display device.

Secure HID interface engine 730 may handle and validate human inputs. This may include, for example, touchscreen inputs on a smart device, hybrid tablet, or other touchscreen enabled device. This may also include validation and verification of input forms. For example, secure HID interface engine 730 may ensure that input strings are not overlong, that they are in the correct format, and that they are usable by application 610.

Secure audio engine 740 may securely handle communication with a speaker and/or microphone. This may enable application 610 to both receive audio inputs from a user, and to provide audio outputs on speakers.

Secure image processing engine 750 may handle, for example, inputs received from a built-in camera on a client device 110.

Secure telemetry engine 760 may be provided to interface with various sensors and actuators on a device. For example, telemetry devices may include an accelerometer, thermometer, compass, or other environmental sensor. In cases where a computing device 110 is an IoT device, the sensor providing telemetry to secure telemetry engine 760 may in fact be the primary purpose of the device. In this context, the telemetry device could be any type of device that provides an environmental measurement.

Secure GPS receiver 770 may provide secure communication with a GPS satellite, and may receive global positioning coordinates for the device.

Finally, binary input analyzer 780 may receive and validate a binary object such as trusted binary object 420 or other binary object. Validation of the object may include verifying that it has a good signature and or verifying the identity of the publisher. Binary input analyzer 780 may also analyzer the binary object by pseudo-compiling it and identifying functions, classes, or variables that handle secure inputs and tagging them for running within enclave 230.

Any of these functional blocks may provide signed and verified inputs 630 in an encrypted form to Java application 610.

Figure 8:
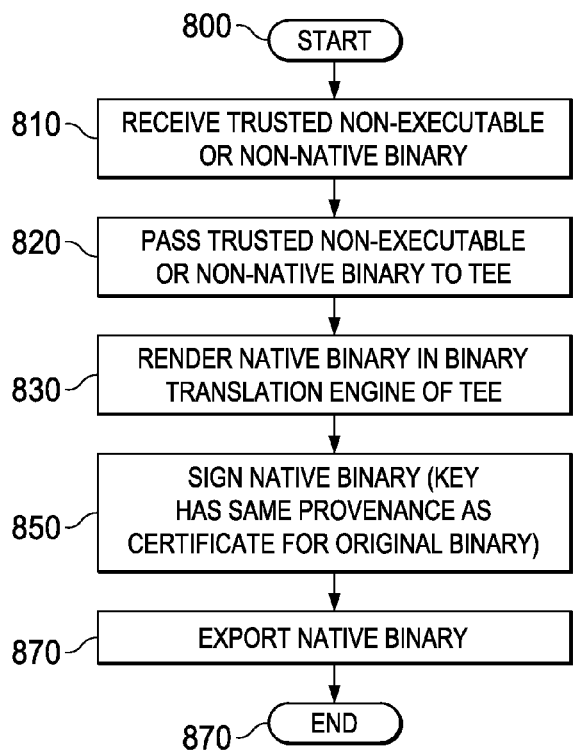
FIG. 8 is a flow diagram of a method of performing binary translation according to one or more examples of the present Specification.

FIG. 8 is a flow diagram of a method 800 performed by a BTE 224 according to one or more examples of the present specification.

In block 810, enclave 230 receives a trusted binary object in a first form that is to be translated into a second binary object in a second form.

In block 820, the trusted binary object is passed to the BTE 224.

In block 830, BTE 224 translates the trusted binary object into the second binary object in the second form.

In block 850, BTE 224 signs the new second binary object, for example with the same key that the original trusted binary was signed with, or with a key that has the same provenance as that key.

In block 870, as appropriate or necessary, BTE 224 may export the new signed native binary 430 out of enclave 230.

In block 890, the method is done.

Figure 9:
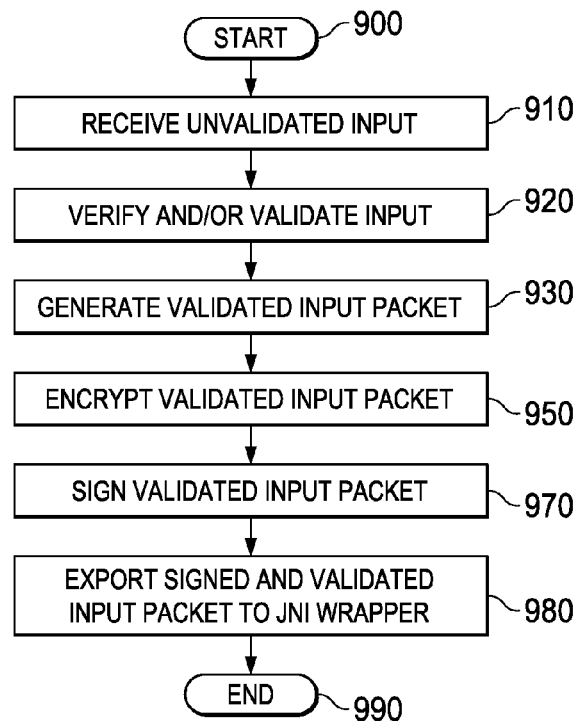
FIG. 9 is a flow diagram of a method of performing input verification according to one or more examples of the present Specification.

FIG. 9 is a flow chart of a method 900 performed by an IVE 460 according to one or more examples of the present specification.

In block 910, IVE 460 receives an unvalidated input.

In block 920, an appropriate functional block of IVE 460 may verify and validate the new input.

In block 930, the appropriate functional block may generate a validated input packet.

In block 950, IVE 460 encrypts the validated input packet.

In block 970, IVE 460 signs the validated input packet.

In block 980, IVE 460 may export the signed and validated input packet, for example to JNI wrapper 620.

In block 990, the method is done.

Figure 10:
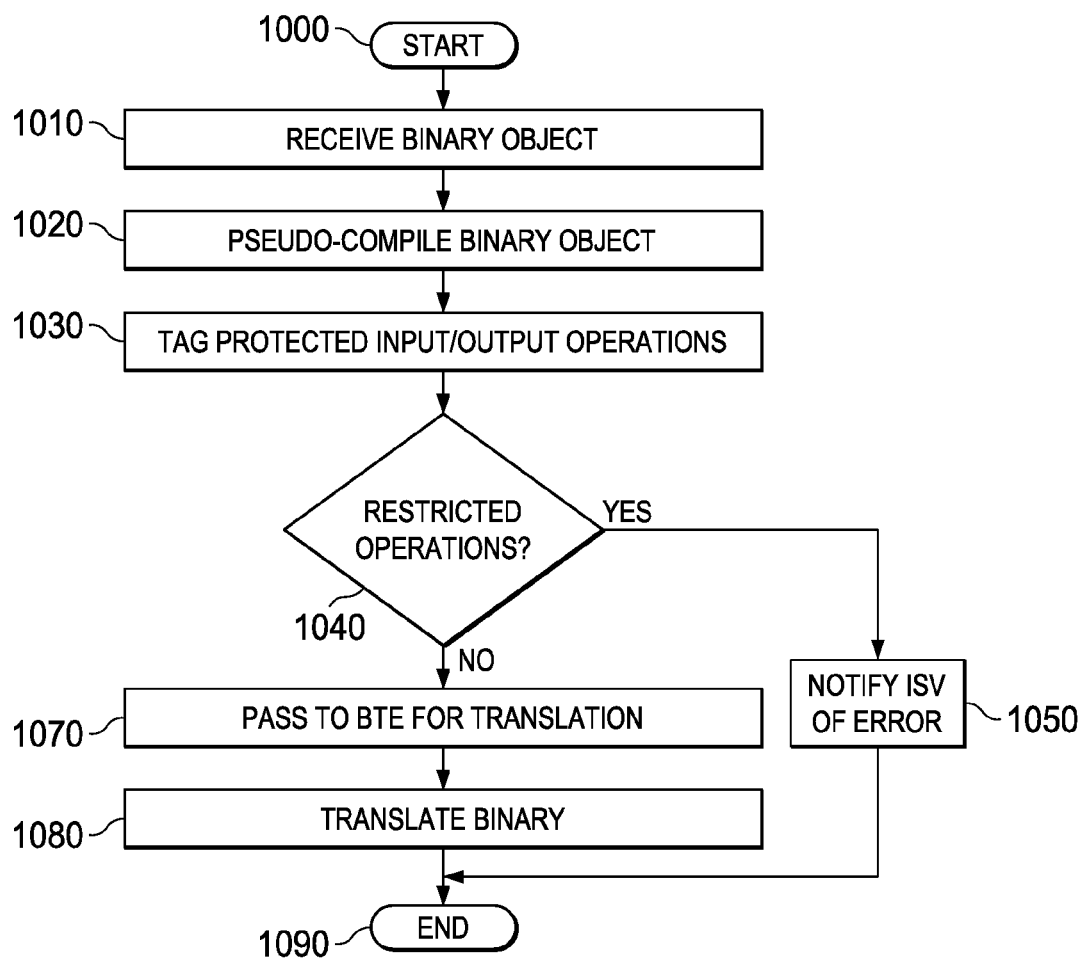
FIG. 10 is a block diagram of an interactive method between IVE 460 and BTE 224 according to one or more examples of the present Specification.

FIG. 10 is a block diagram of an interactive method between IVE 460 and BTE 224 according to one or more examples of the present Specification.

In block 1010, IVE 460 receives a binary object, such as trusted binary object 420.

In block 1020, IVE 460 may pseudo-compile the binary object to identify functions, classes, and/or variables that access protected inputs and outputs.

In block 1030, IVE 460 tags those functions, classes, and/or variables for executing within enclave 230.

In decision block 1040, IVE 460 determines whether there are restricted operations within the tagged portions of the binary. This may include, for example, attempting to write to or read from the file system, or perform another operation that is restricted from within enclave 230.

In block 1050, if a restricted operation is found, then the ISV may be notified of the error.

Returning to block 1040, if there are no restricted operations, then in block 1070, IVE 460 may pass the newly-tagged binary to BTE 224 for binary translation.

In block 1080, BTE 224 translates the binary according to methods described in this Specification.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in an example 1, a computing apparatus comprising: a trusted execution environment (TEE); and one or more logic elements comprising a binary translation engine for operating within the TEE, and operable for: receiving a first signed object in a first format; translating the first signed object into a second object in a second format; and signing the second object.

There is disclosed in an example 2, the computing apparatus of example 1, wherein the first format is a non-native binary format.

There is disclosed in an example 3, the computing apparatus of example 1, wherein the second format is a native binary format.

There is disclosed in an example 4, the computing apparatus of example 1, wherein the TEE comprises a memory enclave.

There is disclosed in an example 5, he computing apparatus of example 1, wherein the TEE comprises a processor operable to provide special TEE instructions.

There is disclosed in an example 6, the computing apparatus of example 1, wherein the binary translation engine comprises a binary translator selected from the group consisting of a runtime engine, an interpreter, a just-in-time compiler, ahead-of-time compiler, a virtual machine, a compiler, a linker, and a toolchain utility.

There is disclosed in an example 7, the computing apparatus of any of examples 1-6, wherein the first signed object is to be signed by a key, and wherein signing the second object comprises signing the second object with the key.

There is disclosed in an example 8, the computing apparatus of any of examples 1-6, wherein first signed object is to be signed with a first key, and wherein signing the second object comprises signing the second object with a second key signed by a common issuer of the first key.

There is disclosed in an example 9, the computing apparatus of any of examples 1-6, wherein first signed object is to be signed with a first key, and wherein signing the second object comprises signing the second object with a second key provided by a vendor of the first object.

There is disclosed in an example 10, the computing apparatus of any of examples 1-6, wherein first signed object is to be signed with a first key, and wherein signing the second object comprises signing the second object with a second key signed by the first key.

There is disclosed in an example 11, the computing apparatus of any of examples 1-6, wherein the binary translation engine is further operable for consulting a certificate expiration or revocation list before signing the second object.

There is disclosed in an example 12, the computing apparatus of any of examples 1-6, wherein the binary translation engine is further operable for receiving a code validation object signed by a code validation object key, and verifying the code validation object key.

There is disclosed in an example 13, the computing apparatus of example 11, wherein verifying the code validation object key comprises receiving a public verification key.

There is disclosed in an example 14, one or more computer-readable mediums having stored thereon instructions that, when executed within a memory enclave, are operable to provide a binary translation engine operable for: receiving a first signed object in a first format; translating the first signed object into a second object in a second format; and signing the second object.

There is disclosed in an example 15, the one or more computer-readable mediums of example 14, wherein the first format is a non-native binary format.

There is disclosed in an example 16, the one or more computer-readable mediums of example 14, wherein the second format is a native binary format.

h There is disclosed in an example 17, the one or more computer-readable mediums of example 14, wherein the binary translation engine comprises a binary translator selected from the group consisting of a runtime engine, an interpreter, a just-in-time compiler, ahead-of-time compiler, a virtual machine, a compiler, a linker, and a toolchain utility.

There is disclosed in an example 18, the one or more computer-readable mediums of any of examples 14-17, wherein the first signed object is to be signed by a key, and wherein signing the second object comprises signing the second object with the key.

There is disclosed in an example 19, the one or more computer-readable mediums of any of examples 14-17, wherein first signed object is to be signed with a first key, and wherein signing the second object comprises signing the second object with a second key signed by a common issuer of the first key.

There is disclosed in an example 20, the one or more computer-readable mediums of any of examples 14-17, wherein first signed object is to be signed with a first key, and wherein signing the second object comprises signing the second object with a second key provided by a vendor of the first object.

There is disclosed in an example 21, the one or more computer-readable mediums of any of examples 14-17, wherein first signed object is to be signed with a first key, and wherein signing the second object comprises signing the second object with a second key signed by the first key.

There is disclosed in an example 22, the one or more computer-readable mediums of any of examples 14-17, wherein the binary translation engine is further operable for consulting a certificate expiration or revocation list before signing the second object.

There is disclosed in an example 23, the one or more computer-readable mediums of any of examples 14-17, wherein the binary translation engine is further operable for receiving a code validation object signed by a code validation object key, and verifying the code validation object key.

There is disclosed in an example 24, a method of providing a binary translation engine, comprising: receiving into a memory enclave a first signed object in a first format; translating, within the enclave, the first signed object into a second object in a second format; and signing, within the enclave, the second object.

There is disclosed in an example 25, the method of example 24, wherein translating comprises: performing runtime engine operations, interpreting, just-in-time compiling, ahead-of-time compiling, providing virtual machine services, compiling, linking, or providing toolchain utility services.

There is disclosed in an example 26, a method comprising the performing the instructions disclosed in any of examples 14-23.

There is disclosed in example 27, an apparatus comprising means for performing the method of example 26.

There is disclosed in example 28, the apparatus of claim 27, wherein the apparatus comprises a processor and memory.

There is disclosed in example 29, the apparatus of claim 28, wherein the apparatus further comprises a computer-readable medium having stored thereon software instructions for performing the method of example 26.

What is claimed is:
1. A computing apparatus comprising:
a processor;
a memory; and
a trusted execution environment (TEE), comprising a memory enclave and processor instructions for accessing the memory enclave; and one or more logic elements, including at least one hardware logic element, comprising a binary translation engine for operating within the TEE, and including a trusted compiler, runtime, or interpreter operable for:
receiving a trusted first signed object in a first format, the first signed object signed by a certificate;
translating the first signed object into a trusted second object in a second format;
consulting a certificate expiration or revocation list to determine that the certificate is not expired; and
after determining that the certificate is not expired, signing the second object.

2. The computing apparatus of claim 1, wherein the first format is a non-native binary format.

3. The computing apparatus of claim 1, wherein the second format is a native binary format.

4. The computing apparatus of claim 1, wherein the TEE comprises a memory enclave.

5. The computing apparatus of claim 1, wherein the TEE comprises a processor operable to provide special TEE instructions.

6. The computing apparatus of claim 1, wherein the first signed object is to be signed by a key, and wherein signing the second object comprises signing the second object with the key.

7. The computing apparatus of claim 1, wherein the first signed object is to be signed with a first key, and wherein signing the second object comprises signing the second object with a second key signed by a common issuer of the first key.

8. The computing apparatus of claim 1, wherein the first signed object is to be signed with a first key, and wherein signing the second object comprises signing the second object with a second key provided by a vendor of the first signed object.

9. The computing apparatus of claim 1, wherein the binary translation engine is further operable for receiving a code validation object signed by a code validation object key, and verifying the code validation object key.

10. The computing apparatus of claim 9, wherein verifying the code validation object key comprises receiving a public verification key.

11. One or more tangible, non-transitory computer-readable mediums having stored thereon instructions that, when executed, are operable to provide a binary translation engine including a trusted compiler, runtime, or interpreter operable for:
establishing a trusted execution environment (TEE) within a memory enclave;
receiving into the enclave a first signed object in a first format, the first signed object signed by a certificate;
translating the first signed object into a trusted second object in a second format within the enclave;
consulting a certificate expiration or revocation list to determine that the certificate is not expired; and
after determining that the certificate is not expired, signing the second object within the enclave.

12. The one or more tangible, non-transitory computer-readable mediums of claim 11, wherein the first format is a non-native binary format.

13. The one or more tangible, non-transitory computer-readable mediums of claim 11, wherein the second format is a native binary format.

14. The one or more tangible, non-transitory computer-readable mediums of claim 11, wherein the binary translation engine comprises a binary translator selected from a group consisting of a runtime engine, an interpreter, a just-in-time compiler, ahead-of-time compiler, a virtual machine, a compiler, a linker, and a toolchain utility.

15. The one or more tangible, non-transitory computer-readable mediums of claim 11, wherein the first signed object is to be signed by a key, and wherein signing the second object comprises signing the second object with the key.

16. The one or more tangible, non-transitory computer-readable mediums of claim 11, wherein the first signed object is to be signed with a first key, and wherein signing the second object comprises signing the second object with a second key signed by a common issuer of the first key.

17. The one or more tangible, non-transitory computer-readable mediums of claim 11, wherein first signed object is to be signed with a first key, and wherein signing the second object comprises signing the second object with a second key provided by a vendor of the first object.

18. The one or more tangible, non-transitory computer-readable mediums of claim 11, wherein the binary translation engine is further operable for receiving a code validation object signed by a code validation object key, and verifying the code validation object key.

19. A method of providing a binary translation engine including a trusted compiler, runtime, or interpreter, comprising:
establishing a memory enclave within a computer memory;
receiving into the memory enclave a trusted first signed object in a first format, the first signed object signed by a certificate;
translating, within the enclave, the first signed object into a trusted second object in a second format;
consulting a certificate expiration or revocation list to determine that the certificate is not expired; and
after determining that the certificate is not expired, signing, within the enclave, the second object.

20. The method of claim 19, wherein translating comprises:
performing runtime engine operations, interpreting, just-in-time compiling, ahead-of-time compiling, providing virtual machine services, compiling, linking, or providing toolchain utility services.

* * * * *